US012115119B2

(12) United States Patent
Bonifas

(10) Patent No.: US 12,115,119 B2
(45) Date of Patent: Oct. 15, 2024

(54) PATIENT LIFTING SYSTEM

(71) Applicant: Guy Elli Bonifas, Montgomery, AL (US)

(72) Inventor: Guy Elli Bonifas, Montgomery, AL (US)

(*) Notice: Subject to any disclaimer, the term of this patent is extended or adjusted under 35 U.S.C. 154(b) by 171 days.

(21) Appl. No.: 17/578,227

(22) Filed: Jan. 18, 2022

(65) Prior Publication Data

US 2023/0225920 A1 Jul. 20, 2023

Related U.S. Application Data

(63) Continuation of application No. 17/300,826, filed as application No. PCT/US2019/000044 on Sep. 11, 2019.

(51) Int. Cl.
*A61G 7/00* (2006.01)
*A61G 7/10* (2006.01)

(52) U.S. Cl.
CPC ......... *A61G 7/1051* (2013.01); *A61G 7/1015* (2013.01); *A61G 7/1017* (2013.01); *A61G 7/1019* (2013.01); *A61G 7/1076* (2013.01)

(58) Field of Classification Search
CPC .. A61G 7/1017; A61G 7/1019; A61G 7/1044; A61G 7/1051; A61G 7/1074; A61G 7/1076; B66C 23/022; B66C 23/027; B66C 23/10; B66C 23/166; B66C 23/203; B66C 23/42; B66C 23/66; B66C 23/68
See application file for complete search history.

(56) References Cited

U.S. PATENT DOCUMENTS

| | | | | |
|---|---|---|---|---|
| 1,540,630 A | | 6/1925 | Jenks et al. | |
| 1,955,259 A | | 4/1934 | Streeter | |
| 2,615,584 A | * | 10/1952 | Adams | B66C 23/48 254/386 |
| 2,833,423 A | | 5/1958 | Tucker | |
| 3,037,641 A | | 6/1962 | Potter et al. | |
| 3,143,216 A | | 8/1964 | Brunkan | |

(Continued)

FOREIGN PATENT DOCUMENTS

| | | | | |
|---|---|---|---|---|
| GB | 2260751 A | * | 4/1993 | A61G 7/1015 |
| WO | WO-0158404 A1 | * | 8/2001 | A61G 7/1017 |
| WO | WO-2009039564 A1 | * | 4/2009 | A61G 7/1015 |

*Primary Examiner* — Emmanuel M Marcelo
(74) *Attorney, Agent, or Firm* — George L Williamson

(57) ABSTRACT

Method and apparatus for a patient lifting system having an upright pole having a lower end attached to a base wherein the base is mounted on a supporting surface such as a floor proximate a bed of the patient. Extending laterally away from the pole is an angularly adjustable arm or extension which is user selectable to be either; e.g., at a 90-degree angle or a 45-degree angle, which arm is supported by a brace connected between the extension arm and the upright pole. The pole is rotatable in a 360 degree arc and is hollow on the inside which allows a load line to travel through the interior of the gin pole from its lower end to its upper outlet end and includes a plurality of pulleys which allow the load line to travel through the inside of the hoisting system. Also included as a part of the hoisting system is a load line attached to the lower end of the pole using a winch or the like. The winch is electrically operated by a handheld electrical controller which can be held in the hand of a patient so that the patient can assist in maneuvering himself.

18 Claims, 4 Drawing Sheets

(56) References Cited

U.S. PATENT DOCUMENTS

| | | | | |
|---|---|---|---|---|
| 4,560,074 | A | 12/1985 | Manning | |
| 4,684,031 | A | 10/1987 | Bergman et al. | |
| 5,056,673 | A | 10/1991 | Williams | |
| 6,059,266 | A | 5/2000 | Ascherin et al. | |
| 6,983,856 | B1 | 1/2006 | Burks | |
| 2005/0097670 | A1 * | 5/2005 | Hawk | A61G 7/1076 5/85.1 |
| 2005/0273927 | A1 * | 12/2005 | Tally | A61G 7/1046 5/89.1 |
| 2011/0302712 | A1 * | 12/2011 | Patterson | A61G 7/1049 5/88.1 |
| 2016/0262967 | A1 * | 9/2016 | Mitchell | A61G 7/1051 |
| 2016/0340155 | A1 | 11/2016 | Jones | |

* cited by examiner

PATIENT LIFTING SYSTEM

RELATED APPLICATIONS

This application is a continuation-in-part of U.S. patent application Ser. No. 17/300,826 filed on Nov. 22, 2021.

BACKGROUND OF THE INVENTION

Field of the Invention

The present invention relates generally to hoisting systems and, more particularly, is concerned with a patient lifting system which enables the user to get into and out abed without assistance from a care giver.

Description of the Related Art

Devices relevant to the present invention have been described in the related art, however, none of the related art devices disclose the unique features of the present invention.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a patient hoisting system having an upright pole having a lower end attached to a base wherein the base is mounted on a supporting surface such as a floor. Extending laterally away from the pole is an angularly adjustable arm or extension which is user selectable to be either; e.g., at a 90-degree angle or a 45-degree angle, which arm is supported by a brace connected between the extension arm and the upright pole. The pole is hollow on the inside which allows a load line to travel through the interior of the gin pole from its lower end to its upper outlet end and includes a plurality of pulleys which allow the load line to travel through the inside of the hoisting system. Also included as a part of the hoisting system is a load line attached to the lower end of the pole using a winch or the like. The winch is electrically operated by a handheld electrical controller which can be held in the hand of a patient so that the patient can assist in maneuvering himself.

An object of the present invention is to provide a patient hoisting system which allows a patient to move himself into and out of bed with having an assistant. A further object of the present invention is to provide a pole assembly which allows the load line to travel through the inside of the pole assembly so as to decrease friction on the load line. A further object of the present invention is to provide a hoisting system which can be easily Operated by a user. A further object of the present invention is to provide a hoisting system which can be relatively inexpensively and easily manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
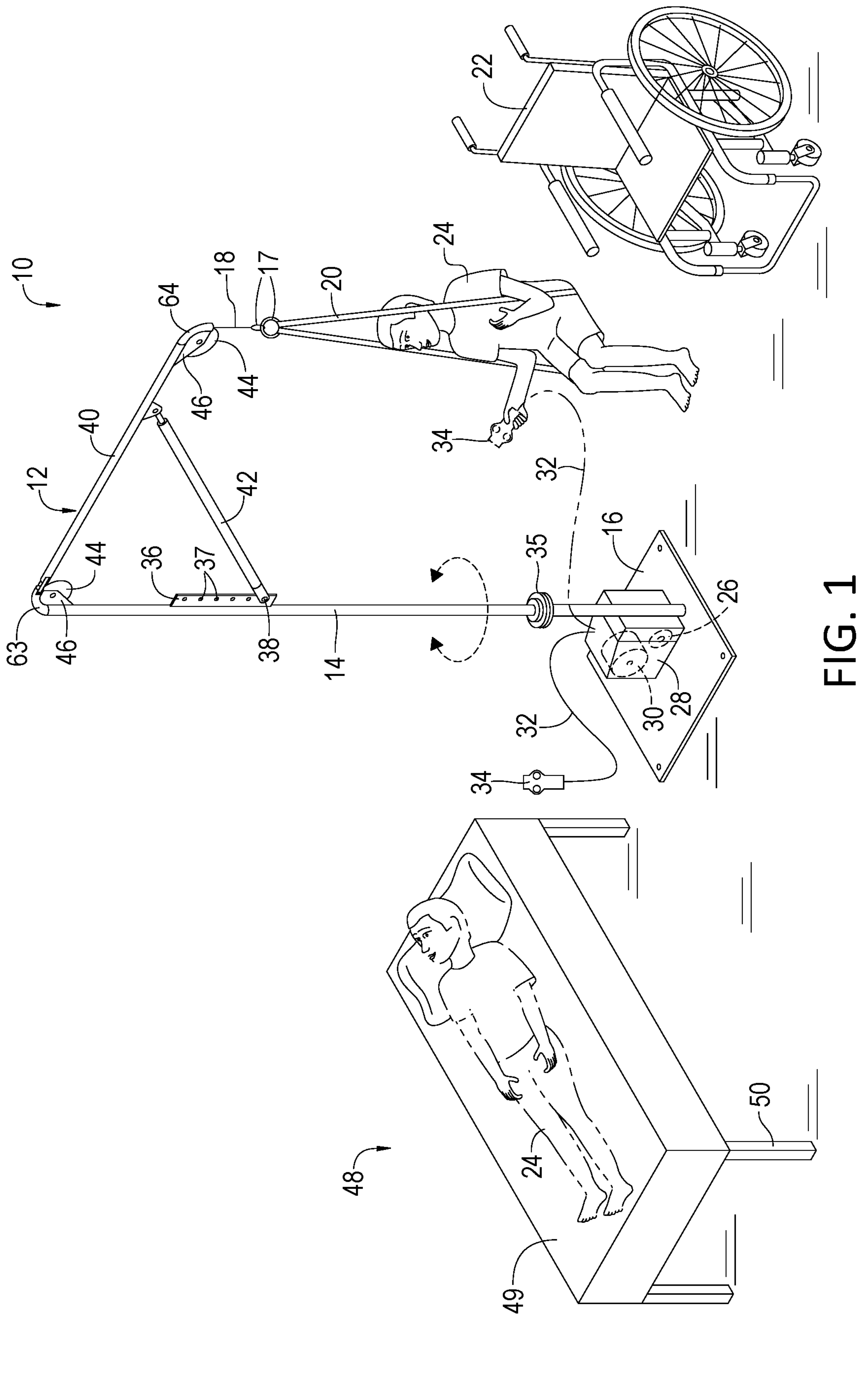
FIG. 1 is a perspective view of the present invention in operative connection.

With regard to reference numerals used, the following numbering is used throughout the drawings,

10 present invention
12 patient lifting assembly
14 upright pole
14U upper upright pole section
14L lower upright pole section
16 base
17 connector
18 load line
20 sling assembly
22 patient lifting chair
24 patient
26 pulley
28 enclosure
30 winch driven by electric motor
32 electrical wiring
34 handheld controller
36 rotating member
36 adjustable bracket
37 apertures
38 pin
40 arm
42 brace
44 pulley
46 mounting bracket
48 patient bed
49 upper surface
50 legs
52 mount
54 pivot
56 outer peripheral portion of pulley
58 pivoting attachment member
60 inside/interior
62 fastener
63 elbow
64 elbow
66 inner ring
68 outer ring
70 ball bearing
72 race/bearing track

74 upper seal
76 lower seal
78 upper flange plate
80 upper weld
82 lower flange plate
84 lower weld
86 nut and bolt
88 nut and bolt

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a patient lifting system is disclosed and which is generally indicated by reference number 10.

Turning to FIG. 1, therein is shown the present invention 10 including a patient lifting assembly 12 which may be used to lift and move a patient 24 from a bed 48 to a chair 22. Bed 48 may be a conventional bed having an upper surface 49 upon which the patient sleeps along with supporting legs 50 at each corner. The patient lifting assembly 12 is illustrated attached to an upper end of an upright standing pole or stanchion 14 mounted on base 16 wherein a load line 18 passes through the interior of the pole 14 and lifting assembly 12 having a connector 17 on its lifting end for attachment to a sling assemble 20 joined to a patient lifting chair 22 with a patient 24 being carried therein. Patient chair 22 may be a wheelchair as illustrated in FIG. 1. The base 16 is expected to be fixedly mounted on a supporting surface such a floor as shown in FIG. 1 proximate to bed 48 and chair 22. The patient 24 can use the bed 49 to manually swing themselves around over the bed or to push themselves around over the wheelchair 22. A rope or strap (not shown) can be installed on the opposite side of the bed 49 that can be used to swing over the bed. If another person is present they can swing the patient 24 around over the bed 49 or the wheelchair 24. The lower end of the load line 18 passes through the lower end of the pole 14 and over a pulley 26 attached to the lower end of the pole 14 within an enclosure 28 wherein the lower end of the load line is connected to an electrically powered winch 30 connected through electrical wiring 32 to a handheld electrical controller 34. The patient lifting assembly 12 is manually horizontally rotatable by means of a special bearing assembly 36 mounted in the pole 14. Also shown as a part of the patient lifting assembly 12 is a vertically adjustable bracket 36 mounted onto upright pole 14 and having a plurality of vertically spaced apart apertures 37 therein for allowing insertion and removal of a pin 38 on a lower end of brace 42 having one end of the brace extending from the upright pole 14 and a second end attached to arm 40 so that the horizontal arm 40 is supported by the brace 42 so as to provide support for the arm 40 which extends laterally from upright pole 14. The pin 38 can be removed from a first aperture 37 and then placed in a second aperture 37 so as to allow the arm 40 to be height adjustable. The patient lifting assembly 12 also includes a plurality of pulleys 26 and 44 which extend into the interior of the patient lifting assembly 12 to reduce friction of line 18 with the pulleys 26, 44 being attached to the gin pole assembly 12 using mounting brackets 46. Elbows 63, 64 are also shown.

Figure 2:
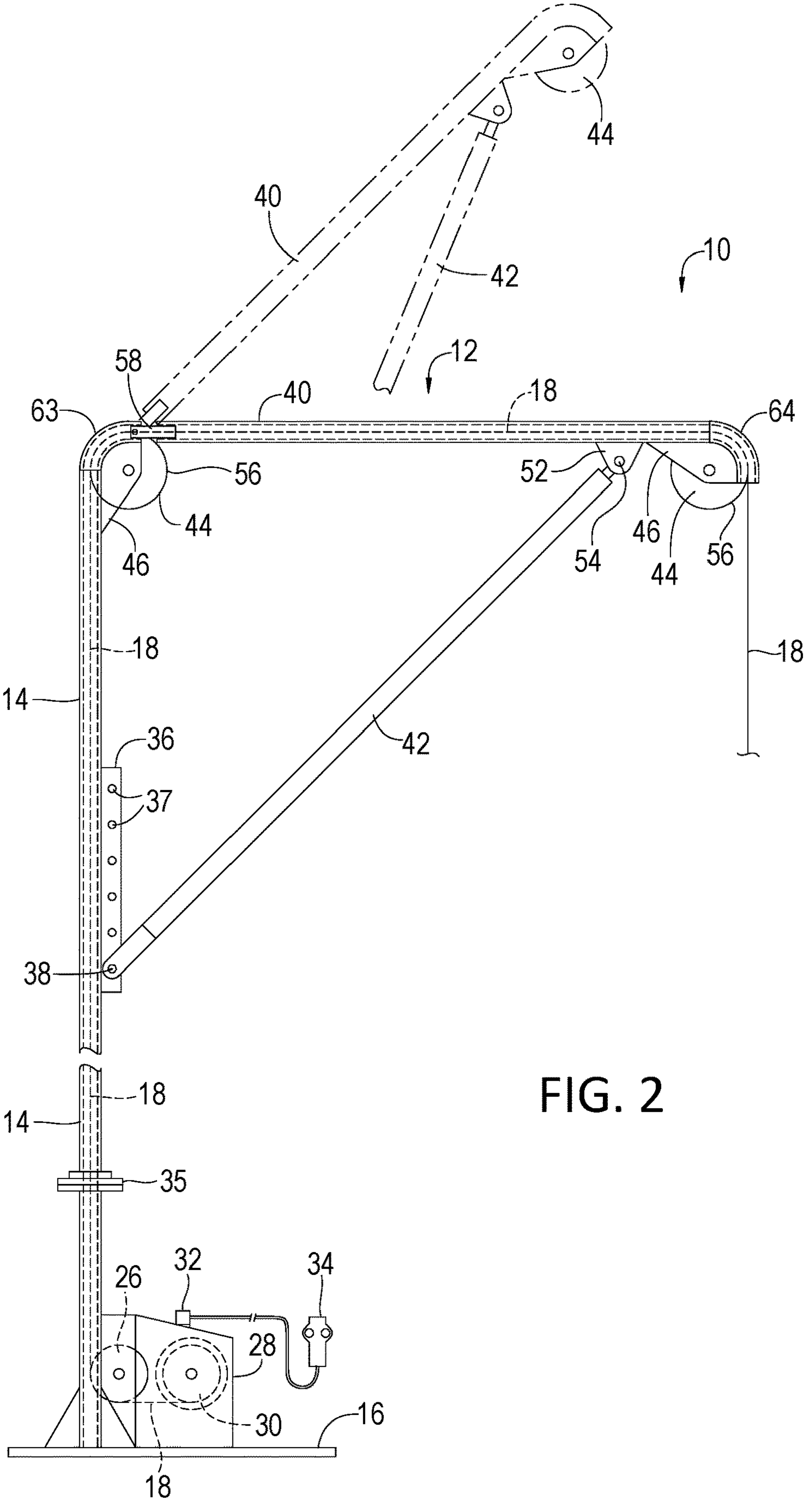
FIG. 2 is a side elevation view of the gin pole assembly of the present invention.
Figure 3:
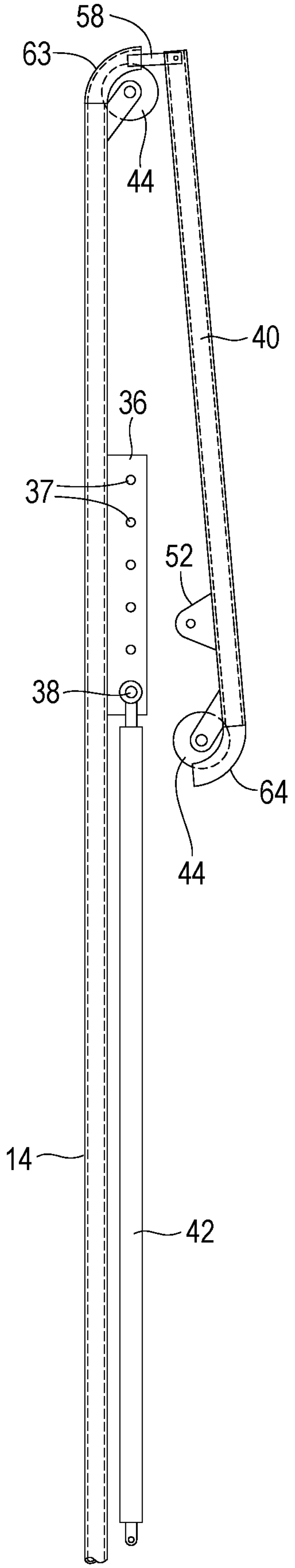
FIG. 3 is a side elevation view of the gin pole assembly of the present invention in a folded position.

Turning to FIGS. 2 and 3, therein is shown the patient lifting assembly 12 with the upper portion of pole 14 and arm 40 extending laterally therefrom and including a brace 42 having a lower end joined at pin 38 to the adjustable bracket 36 and showing the upper end of brace 42 connected to mounting bracket 52 on arm 40 with a pivot point 54 thereon and also showing the arm 40 being attached on one end using a pivotal member 58 which allows the arm 40 to be angularly adjustable manually from a user selectable position horizontally perpendicular to the pole 14 up to an angle of approximately 45 degrees with the pole 14 as shown in FIG. 2. Also shown are the pulleys 44 with mounting brackets 46 for attachment to the patient lifting assembly 12 wherein the pulleys have an outer peripheral portion 56 which extends into the interior of the patient lifting assembly 12 so that the outer periphery of the pulley 44 is approximately at the center line of the patient lifting assembly 12 so that the load line 18 can pass through the inside of the pole 14 and arm 40 so that the load line travels on the inside of the patient lifting assembly 12 spaced away from the interior surface of the pole 14 and arm 40 thereby reducing friction between the load line 18 and the inside surface of the patient lifting assembly 12. Also shown are the pulleys 44 attached to the members of the patient lifting assembly 12 using mounting brackets 46. An alternative angle of about 45 degrees for the arm 40 is shown in phantom line. FIG. 2 shows the patient lifting 38 attached to a pole 14. FIG. 3 shows the patient lifting assembly 12 in a folded configuration which is accomplished by disconnecting one end of the brace 42 from arm 40 wherein arm 40 is folded so as to be substantially parallel to pole 14.

Figure 4:
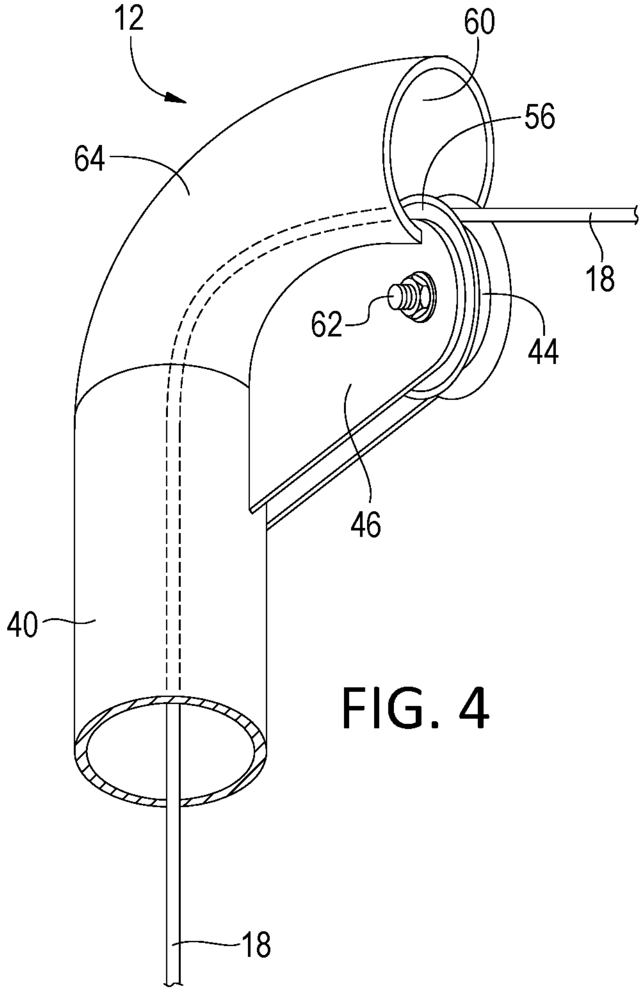
FIG. 4 is a detailed view of a pulley assembly of the gin pole assembly of the present invention.

Turning to FIG. 4, therein is shown an enlarged view of the elbow portion 64 of the patient lifting assembly 12 disposed on a distal end of arm 40 along with the pulley 44 and the mounting bracket 46 wherein the pulley 44 is attached thereto using a fastener 62, e.g., a nut and bolt as shown herein or the like. It can be seen that the periphery 56 of the pulley extends into the interior 60 of the hollow elbow portion 64 of patient lifting assembly 12 so that the load line 18 passes with a minimum amount of friction through the inside of the members of the patient lifting assembly 12. The pulley 44 is shown attached to an elbow portion 64 of the patient lifting assembly 12. Elbow 63 is constructed similarly to elbow 64.

The present invention 10 has an arm 40 which extends laterally away and out from the pole 14 allowing the patient 24 to remain spaced apart from the pole 4 to 6 feet while being raised or lowered keeping the patient safely and unencumbered away from pole 14.

Figure 5:
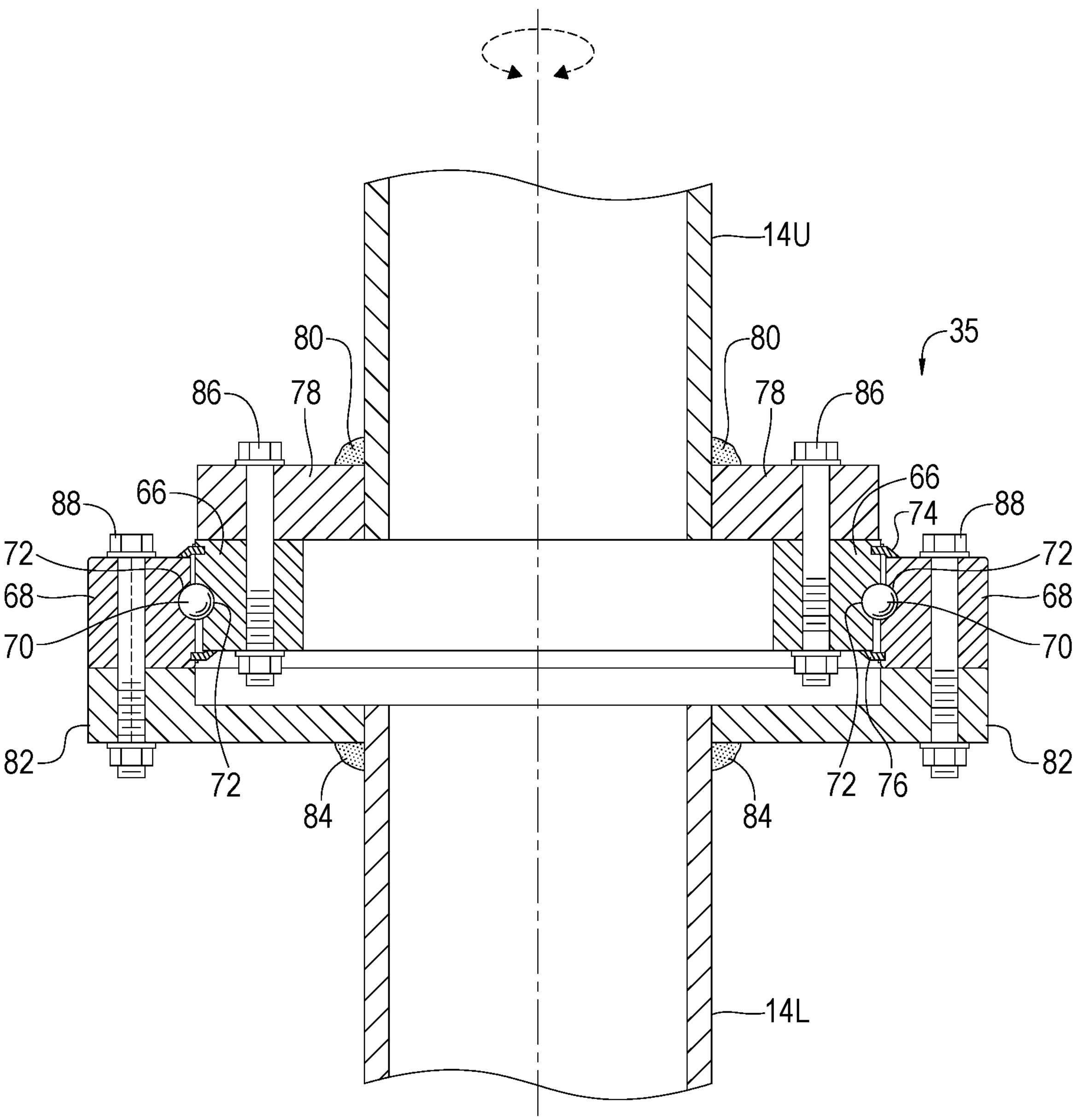
FIG. 5 is a cross-sectional view of a rotating member of the present invention.

Turning to FIG. 5, therein is shown an enlarged view of the rotating member 35 showing portions of the pole 14U above the rotating member 35 and a portion of the pole 14L below the rotating member 35. Rotating member 35 could comprise a slewing bearing having an inner ring 66 and an outer ring 68 which rings have a plurality of ball bearings 70 disposed in between the inner and outer rings which ball bearings roll on a race or bearing track 72 which is formed in the surfaces of the mating inner and outer rings along with an upper and lower seal 74 and 76 which keep the space between the inner and outer rings clean. Also shown is an upper flange plate 78 which is welded to the upper pole 14U section at 80 along with a lower flange plate 82 which is welded at 84 to the lower pole section 14L. The inner ring 66 is joined to the upper flange plate 78 using nuts and bolts 86 and outer ring 68 is joined to lower flange plate 82 using nuts and bolts 88 so that the entire assembly of the rotating member 35 is fixedly attached to the pole 14. The rotating member 35 allows the pole 14 to rotate in a 360 degree arc.

By way of summary and by making reference to FIGS. 1-5, the present invention 10 discloses a method for lifting a patient 24 using a load line 18 wherein the structure is upright standing and supported on a support surface, comprising the steps of providing an elongated pole 14 (including 14U,14L) having upper and lower ends, the lower end being supported on a base 16 so that the pole is upright standing, wherein the pole is hollow thereby having an interior and an arm 40 having proximal and distal ends, the proximal end being pivotally attached to the upper end of the pole, wherein the arm extends laterally away from the pole, wherein the arm is hollow thereby having an interior and being angularly adjustable relative to the arm and providing a brace 42 for supporting the arm, wherein one end of the brace is pivotally connected to the pole and an opposite end of the brace is pivotally connected to the arm and disposing a first elbow portion 63 on the upper end of the pole, a second elbow portion 64 being disposed on the distal end of the arm so as to terminate in a free end, the free end of the second elbow portion having a longitudinal centerline which is substantially parallel to a longitudinal centerline of the pole and providing a pair of pulleys 44, wherein one pulley is mounted on an inside radius of each of the first and second elbow portions so that a portion of each the pulley passes through the inside radius and extends into the interior of each the first and second elbow portion and providing a load line 18 having first and second ends, wherein the load line passes through the interior of the pole and the arm, wherein the load line has the first end connected to a winch 30 disposed on the base and the second end for supporting the patient, wherein the load line passes over the first and second pulleys so that the load line is disposed in the interior of the gin pole and the arm, wherein the load line is spaced away from an inner surface of the pole and the arm to reduce friction; and having a rotatable member 35 in the pole to permit the pole and the arm to rotate in a 360 degree arc. Also, wherein the winch is operably joined to an electric motor 30 and has a sling assembly 20 for supporting the patient on the load line. Also provided is a handheld electric controller 34 for controlling the electric motor so that the load line can be raised or lowered along with a third pulley 26 being attached to a lower end of the pole, wherein the load line passes over the third pulley, and, wherein the first and second elbow portions are ninety-degree elbow portions and the arm is angularly adjustable between an angle being perpendicular with respect to the pole to an angle of about forty-five degrees with respect to the pole and the rotatable member 35 includes a slewing bearing.

I claim:

1. A system for lifting a patient using a load line, the system being upright standing and supported on a support surface, comprising:

a) an elongated pole having upper and lower ends, said lower end being supported on a base so that said pole is upright standing, wherein said pole is hollow thereby having an interior;
b) an arm having proximal and distal ends, said proximal end being pivotally attached to said upper end of said pole, wherein said arm extends laterally away from said pole, wherein said arm is hollow thereby having an interior;
c) wherein said arm is angularly adjustable with respect to said pole;
d) a brace for supporting said arm, wherein one end of said brace is pivotally connected to said pole and an opposite end of said brace is pivotally connected to said arm;
e) a first elbow portion being disposed on said upper end of said pole, a second elbow portion being disposed on said distal end of said arm so as to terminate in a free end, said free end of said second elbow portion having a longitudinal centerline which is substantially parallel to a longitudinal centerline of said pole;
f) a pair of pulleys, wherein one said pulley is mounted on an inside radius of each said first and second elbow portions so that a portion of each said pulley passes through said inside radius and extends into said interior of each said first and second elbow portion;
g) a load line having first and second ends, wherein said load line passes through said interior of said pole and said arm, wherein said load line has said first end connected to a winch disposed on said base and said second end for supporting the patient;
h) wherein said load line passes over said first and second pulleys so that said load line is disposed in said interior of said pole and said arm, wherein said load line is spaced away from an inner surface of said pole and said arm to reduce friction; and
i) a rotatable member disposed in said pole to permit said pole and said arm to rotate in a 360 degree arc.

2. The system of claim 1, wherein said winch is operably joined to an electric motor.

3. The system of claim 2, further comprising an electric controller for controlling said electric motor so that said load line can be raised or lowered.

4. The system of claim 3, wherein said electric controller has a handheld controller for being operated by the patient.

5. The system of claim 1, further comprising a sling assembly for supporting said patient on said load line.

6. The system of claim 1, further comprising a third pulley being attached to a lower end of said pole, wherein said load line passes over said third pulley.

7. The system of claim 1, wherein said first and second elbow portions are ninety-degree elbow portions.

8. The system of claim 1, wherein said arm is angularly adjustable between an angle being perpendicular with respect to said pole to an angle of about forty-five degrees with respect to said pole.

9. The system of claim 1, wherein said rotatable member further comprises a slewing bearing.

10. A method for lifting a patient using a load line, the method for lifting being upright standing and supported on a support surface, comprising the steps of:

a) providing an elongated pole having upper and lower ends, the lower end being supported on a base so that the pole is upright standing, wherein the pole is hollow thereby having an interior;
b) providing an arm having proximal and distal ends, the proximal end being pivotally attached to the upper end of the pole, wherein the arm extends laterally away from the pole, wherein the arm is hollow thereby having an interior;
c) angularly adjusting the arm with respect to the pole;
d) providing a brace for supporting the arm, wherein one end of the brace is pivotally connected to the pole and an opposite end of the brace is pivotally connected to the arm;
e) disposing a first elbow portion on the upper end of the pole, a second elbow portion being disposed on the distal end of the arm so as to terminate in a free end, the free end of the second elbow portion having a longitudinal centerline which is substantially parallel to a longitudinal centerline of the pole;

f) providing a pair of pulleys, wherein one pulley is mounted on an inside radius of each of the first and second elbow portions so that a portion of each pulley passes through the inside radius and extends into an interior of each of the first and second elbow portion;

g) providing a load line having first and second ends, wherein the load line passes through the interior of the pole and the arm, wherein the load line has the first end connected to a winch disposed on the base and the second end for supporting the patient;

h) wherein the load line passes over the first and second pulleys so that the load line is disposed in the interior of the pole and the arm, wherein the load line is spaced away from an inner surface of the pole and the arm to reduce friction; and i) disposing a rotatable member in the pole to permit the pole and the arm to rotate in a 360 degree arc.

11. The method of claim 10, wherein the winch is operably joined to an electric motor.

12. The method of claim 11, further comprising the step of providing an electric controller for controlling the electric motor so that the load line can be raised or lowered.

13. The method of claim 12, wherein the electric controller has a handheld controller for being operated by the patient.

14. The method of claim 10, further comprising the step of providing a sling assembly for supporting the patient on the load line.

15. The method of claim 10, further comprising the step of providing a third pulley being attached to the lower end of the pole, wherein the load line passes over the third pulley.

16. The method of claim 10, wherein the first and second elbow portions are ninety-degree elbow portions.

17. The method of claim 10, wherein the arm is angularly adjustable between an angle being perpendicular with respect to the pole to an angle of about forty-five degrees with respect to the pole.

18. The method of claim 10, wherein the rotatable member further comprises the step of providing a slewing bearing.

* * * * *